(12) United States Patent
Maejima et al.

(10) Patent No.: US 7,712,204 B2
(45) Date of Patent: May 11, 2010

(54) MANUFACTURING METHOD OF A THIN-FILM MAGNETIC HEAD

(75) Inventors: Kazuhiko Maejima, Chuo-ku (JP); Makoto Hasegawa, Chuo-ku (JP); Atsuhiro Nonaka, Chuo-ku (JP); Hiroshi Kamiyama, Chuo-ku (JP); Teruhisa Shindo, Chuo-ku (JP); Hiroshi Yamazaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 529 days.

(21) Appl. No.: 11/711,017

(22) Filed: Feb. 27, 2007

(65) Prior Publication Data

US 2007/0230064 A1    Oct. 4, 2007

(30) Foreign Application Priority Data

Mar. 31, 2006  (JP)  ............................. 2006-097582
Sep. 27, 2006  (JP)  ............................. 2006-261974

(51) Int. Cl.
*G11B 5/187*  (2006.01)
*B24C 1/08*   (2006.01)

(52) U.S. Cl. .............. 29/603.12; 29/603.11; 29/603.15; 29/603.16; 451/36; 451/41; 451/57; 360/317; 360/320

(58) Field of Classification Search ................ 29/603.1, 29/603.11, 603.12, 603.15, 603.16, 603.18; 451/36, 41, 57; 360/317, 319, 320
See application file for complete search history.

(56) References Cited

U.S. PATENT DOCUMENTS 5,809,636 A  *  9/1998  Shouji et al. ............ 360/317 X
2005/0160586 A1 * 7/2005  Lahiri et al. ............. 29/603.12

FOREIGN PATENT DOCUMENTS

JP    2000242917 A  *  9/2000
JP    2004-268182 A     9/2004

* cited by examiner

*Primary Examiner*—A. Dexter Tugbang
(74) *Attorney, Agent, or Firm*—Frommer Lawrence & Haug LLP

(57) ABSTRACT

A manufacturing method of a thin-film head includes the steps of, laminating and patterning a soft magnetic layer with iron alloy that contains silicon and aluminum through a base layer on a substrate; laminating an insulating layer on the patterned soft magnetic layer; performing a chemical-mechanical polishing of a surface of the laminated insulating layer and the patterned soft magnetic layer with a first acid slurry; forming a lower shield layer by a mechanical polishing with a second weak acid, or neutral slurry with a pH different from that of the first slurry; and forming a lower shield gap layer and a magnetoresistive effect layer on the lower shield layer.

9 Claims, 5 Drawing Sheets

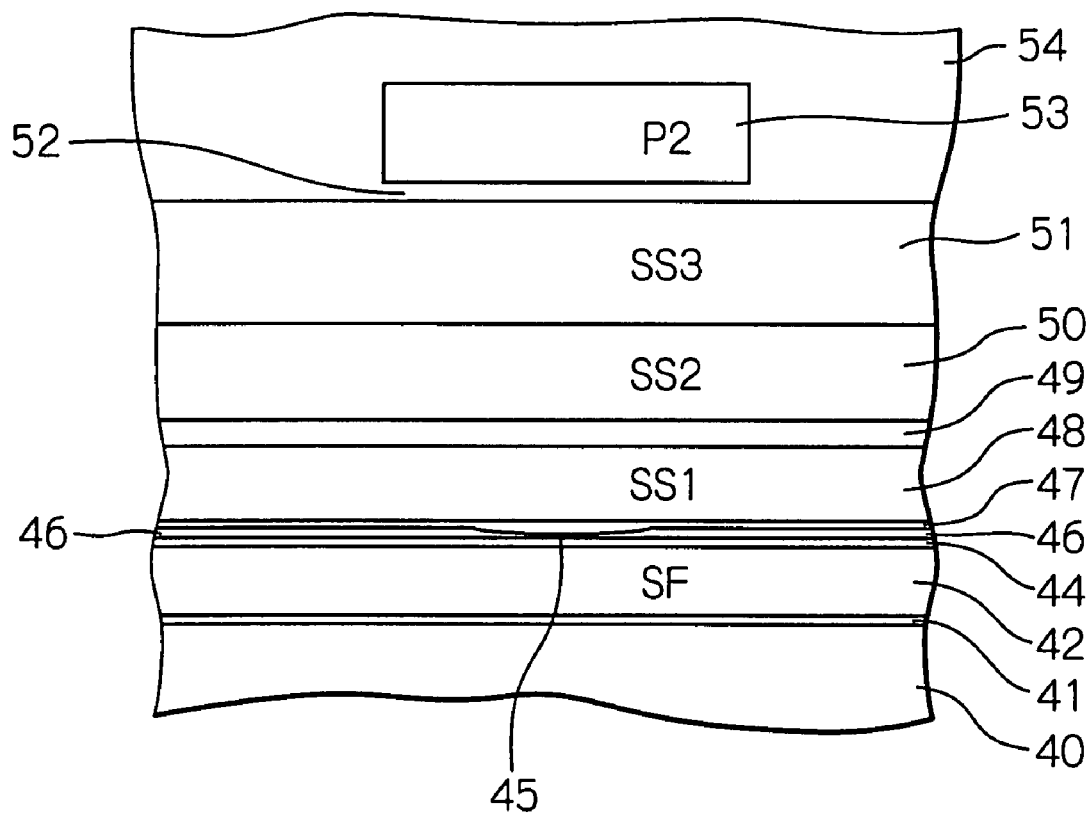

MANUFACTURING METHOD OF A THIN-FILM MAGNETIC HEAD

PRIORITY CLAIM

This application claims priorities from Japanese patent application No. 2006-97582, filed on Mar. 31, 2006, and Japanese patent application No. 2006-261974, filed on Sep. 27, 2006, which are incorporated herein by reference.

BACKGROUND OF THE INVENTION

1. Field of the Invention

The present invention relates to a polishing method of a soft magnetic layer in a thin-film magnetic head having the soft magnetic layer with iron (Fe) alloy that contains silicon (Si) and aluminum (Al), a manufacturing method of a thin-film magnetic head and a thin-film magnetic head.

2. Description of the Related Art

In general, nickel-iron (NiFe) alloy (permalloy) is used as soft magnetic material for a shield layer. In the case of manufacturing a magnetoresistive (MR) effect read head element of a thin-magnetic head by stacking a lower shield layer with permalloy, it is preformed to planarize the surface of the stacked lower shield layer by a chemical-mechanical polishing (CMP). This planarization is preformed to stabilize photo accuracy in forming the MR layer or the lead conductor layer on the lower shield layer.

As the CMP method of permalloy, Japanese patent publication No. 2004-268182A discloses the polishing method which includes, polishing with a acid polish liquid whose pH is more than or equal 1 and less than 7, and then polishing the alkali polish liquid whose pH is more than 7 and less than or equal 14.

BRIEF SUMMARY OF THE INVENTION

As aforementioned, in the case of forming the shield layer with permalloy, there is no problem to planarize this surface by the CMP method. However, for the high ductility of permalloy, there is a case which a read head characteristics extremely decreases by continuity between the MR layer and the shield layer, with arising the so-called smear which a part of a tape bearing surface (TBS) side or an air bearing surface (ABS) side of the shield layer that projects out the insulating layer side by the head manufacturing process which performed after a wafer process or a sliding with a recording medium and a completed thin-film magnetic head.

On the other hand, as the soft magnetic material with a fine anti smear characteristics, there is sendust which is a kind of iron alloy that contains Si and Al. However, in the case of planarizing the surface of the layer formed with said sendust by the ordinary CMP, as this material consists of a component where a chemical etching rate is different, it is absolutely impossible to well planarize this material. So, in the case of using sendust for the shield layer, as the prior art cannot planarize that surface, it cannot avoid forming the MR layer or a lead conductive layer on a coarse surface which is not planarized. Consequently a wave happens on the MR layer or the lead conductive layer, and a great variation has occurred in output characteristics of the MR read head element.

Therefore, it is an object of the present invention to provide a polishing method of a soft magnetic layer of a thin-film magnetic head and a manufacturing method of a thin-film magnetic head that can planarize the surface by the CMP, even in the case of using iron alloy that contains Si and Al as a shield layer.

Another object of the present invention is to provide a thin-film magnetic head that has a shield layer of which the surface is planarized in spite of forming with iron alloy that contains Si and Al.

According to the present invention, a polishing method of the soft magnetic layer in the thin-film magnetic head is provided, which includes, performing the CMP with a first acid slurry, in the case of polishing a soft magnetic layer with iron alloy that contains Si and Al, and then performing a mechanical polishing (fine mechanical polishing, MP) with a second weak acid or neutral slurry with a pH different from that of the first slurry.

With performing the CMP with the first acid slurry, then performing the MP with the second slurry which is the weak acid or neutral slurry with the pH different from that of the first slurry, it is possible to finely planarize even the soft magnetic layer with iron alloy that contains Si and Al by the CMP, therefore, it is possible to extremely suppress a characteristics variation of the layer which is stacked on this layer.

It is preferred that the CMP and the MP perform on the same polishing equipment.

Preferably, the soft magnetic layer is the soft magnetic layer with a columnar crystal structure.

It is preferred that the first slurry contains aluminum oxide ($Al_2O_3$, alumina) as a polishing agent, and further contains organic acid. In this case, it is further preferred that the pH of the first slurry is from 3.7 to 4.3.

It is also preferred that the second slurry contains $Al_2O_3$ as a polishing agent, and further contains nitric acid chemical compound. In this case, it is further preferred that the pH of the second slurry is from 6 to 7.

It is preferred that the soft magnetic layer is a lower shield layer of a MR read head element.

According to the present invention, also, a manufacturing method of a thin-film magnetic head is provided, which include, laminating and patterning a soft magnetic layer with iron alloy that contains Si and Al through a base layer on a substrate, and then laminating a insulating layer on the patterned soft magnetic layer, and performing a chemical-mechanical polishing a surface of the laminated insulating layer and the soft magnetic layer with a first acid slurry, and forming a lower shield layer by a mechanical polishing with a second weak acid or neutral slurry with a pH different from that of the first slurry, and then forming a lower shield gap layer and a MR layer on that layer.

For the soft magnetic layer with iron alloy that contains Si and Al, with performing the CMP with the first acid slurry, then performing the MP with the second slurry which is the weak acid or neutral slurry with the pH different from that of the first slurry, it is possible to form the lower shield layer with planarizing the surface of the soft magnetic layer by the CMP, therefore, it is possible to extremely suppress the characteristics variation of the MR layer which is stacked on this layer.

It is preferred that the CMP and the MP perform on the same polishing equipment.

Preferably, the soft magnetic layer is the soft magnetic layer with a columnar crystal structure.

It is preferred that the first slurry contains $Al_2O_3$ as a polishing agent, and further contains organic acid. In this case, it is further preferred that the pH of the first slurry is from 3.7 to 4.3.

It is also preferred that the second slurry contains $Al_2O_3$ as a polishing agent, and further contains nitric acid chemical compound. In this case, it is further preferred that the pH of the second slurry is from 6 to 7.

It is preferred that a manufacturing method includes, stacking an upper shield gap layer on a lower shield gap layer and a MR layer, and then stacking an upper shield layer on the upper shield gap layer.

It is preferred that the manufacturing method includes forming an inductive write head element on the upper shield layer.

According to the present invention, furthermore, a thin-film magnetic head is provided, which includes a lower shield layer with iron alloy that contains Si and Al stacked through a base layer on a substrate, and a lower shield gap layer formed on the lower shield layer, and a MR layer formed on the lower shield gap layer, and an upper shield gap layer formed on the MR layer and the lower shield gap layer, and an upper shield layer formed on the upper shield gap layer, with a surface of the lower shield layer being planarized as a surface roughness is less than or equal 1 nm (nanometer).

In the case of forming the lower shield layer with iron alloy that contains Si and Al, it is possible that the surface roughness is less than or equal 1 nm by planarizing the surface with aforementioned polishing method. Therefore, it is possible to obtain a fine MR output, because the characteristics variation of the MR layer which is stacked on this layer is extremely suppressed.

It is preferred that the thin-film magnetic head further includes an inductive write head element formed on the upper shield layer.

According to the present invention, it is possible to finely planarize by the CMP, even in the case of the soft magnetic layer with iron alloy that contains Si and Al, therefore, it is possible to extremely suppress the characteristics variation of the layer which is stacked on this layer.

Further objects and advantages of the present invention will be apparent from the following description of the preferred embodiments of the invention as illustrated in the accompanying drawings.

BRIEF DESCRIPTION OF THE SEVERAL VIEWS OF THE DRAWINGS

FIG. 4 shows a side view seen from a TBS direction schematically illustrating a configuration of each write/read magnetic head element of the thin-film magnetic head shown in FIG. 1;

DETAILED DESCRIPTION OF THE INVENTION

Figure 1:
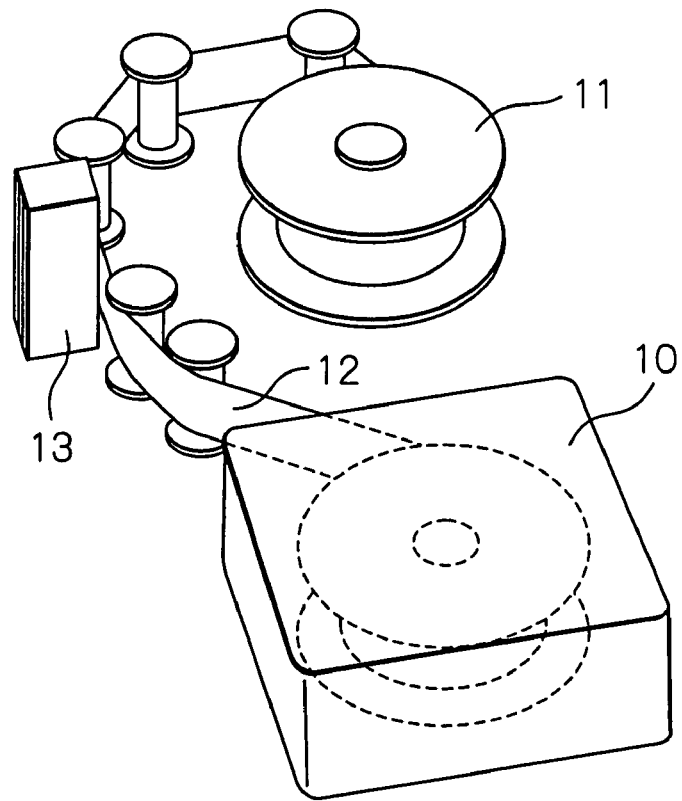
FIG. 1 shows an oblique view schematically illustrating a configuration of a multi channel magnetic tape device as an embodiment according to the present invention.
Figure 2:
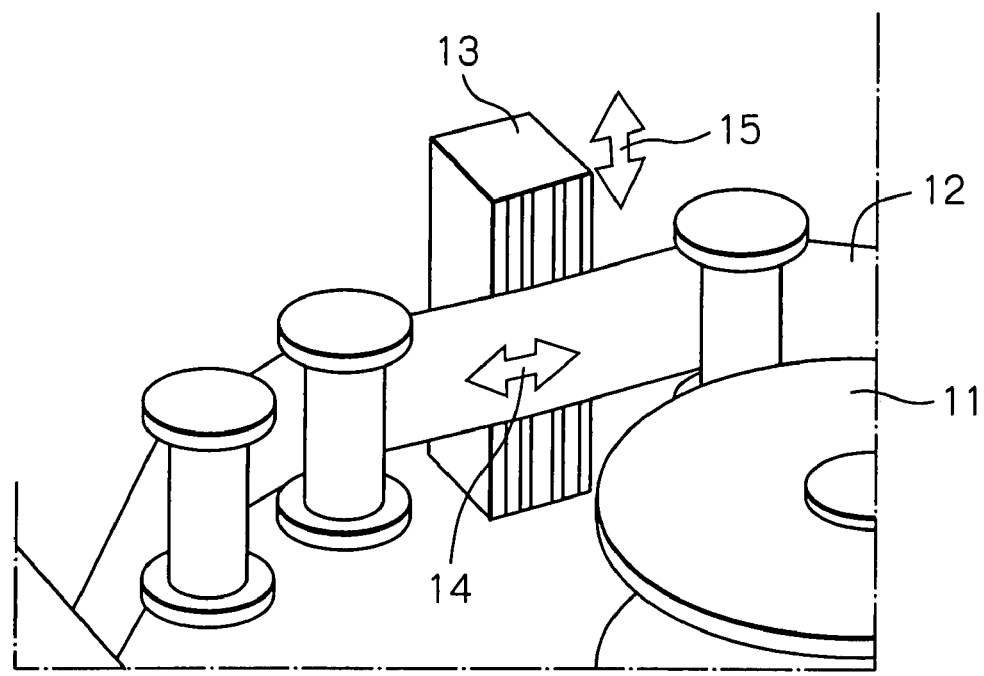
FIG. 2 shows an enlarged oblique view illustrating a configuration of a thin-film magnetic head and this peripheral part shown in FIG. 1.

FIG. 1 shows an oblique view schematically illustrating a configuration of a multi channel magnetic tape device as an embodiment according to the present invention, and FIG. 2 shows an enlarged oblique view illustrating a configuration of a thin-film magnetic head and this peripheral part shown in FIG. 1.

This embodiment is the case where this invention applied to the tape drive of the linear tape open (LTO). Surely, this invention is not limited to the tape drive of LTO, and this invention can also apply to all tape drive, disk drive and drum drive of a multi channel.

In FIG. 1 and FIG. 2, reference numeral 10 indicates a single reel tape cartridge, and 11 indicates a take-up reel which temporarily retracts a magnetic tape 12 pulled out of the tape cartridge 10, and 13 indicates a thin-film magnetic head which allows a reciprocating movement to the vertical direction (track width direction) 15 toward the reciprocating running direction 14 of the magnetic tape 12, respectively.

As known, the LTO execute write/read operations to a half-inch width magnetic tape 12. Therefore, the thin-film magnetic head 13 includes plural write/read magnetic head elements and two servo read head elements.

Figure 3:
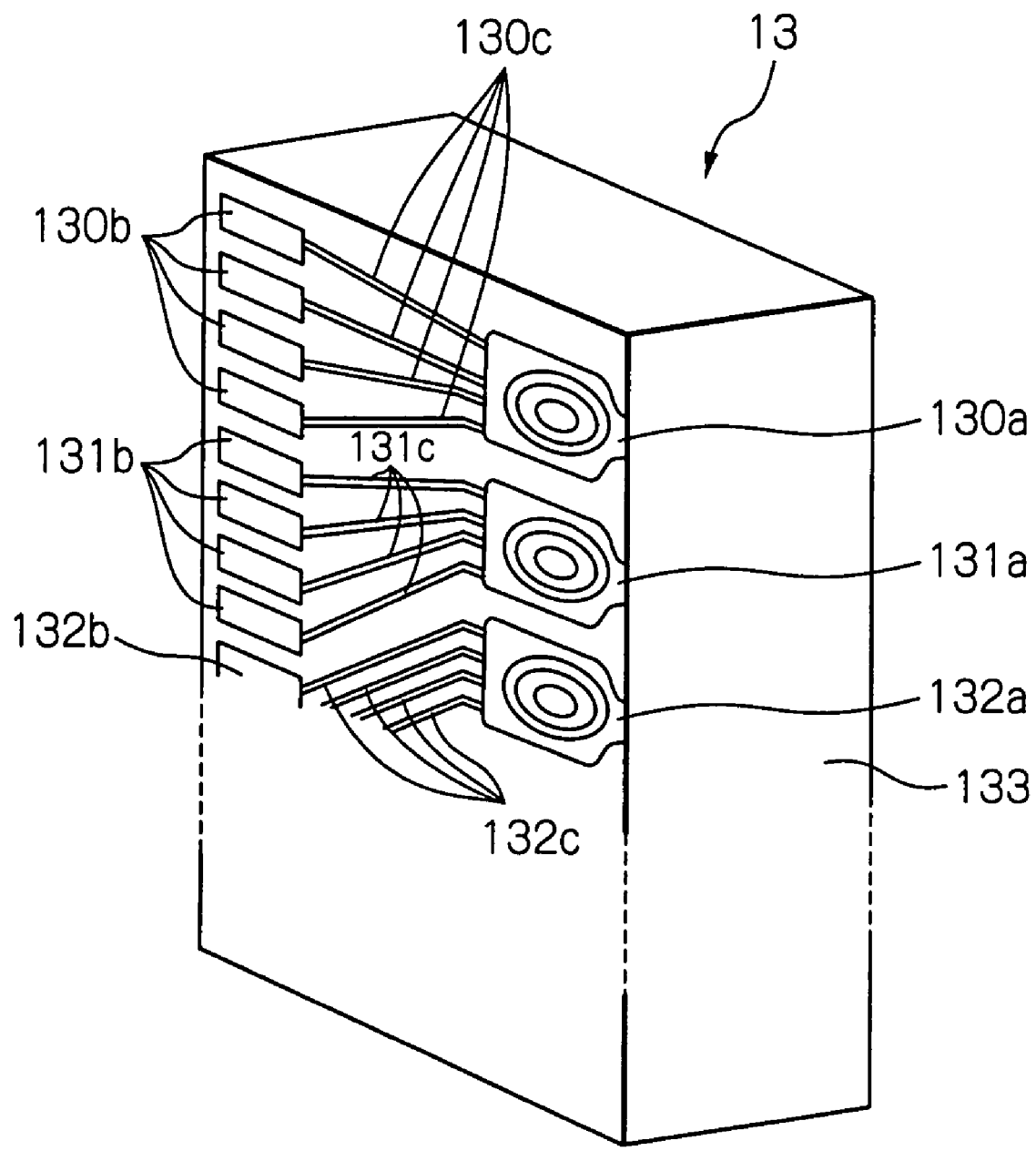
FIG. 3 shows an oblique view schematically illustrating a configuration of the thin-film magnetic head shown in FIG. 1.

FIG. 3 shows an oblique view schematically illustrating a configuration of this thin-film magnetic head according to this embodiment. But this figure shows only three write/read magnetic head elements to understand easily, omits to show the other write/read magnetic head elements, a layer formed on the write/read magnetic head element and so on.

In this figure, reference numerals 130a, 131a and 132a indicate three write/read magnetic head elements linearly arranged along a track width direction on the plane which is vertical to a TBS 133, and 130b, 131b and 132b indicate a terminal electrodes for the write/read magnetic head elements 130a, 131a and 132a, and 130c, 131c and 132c indicate lead conductors which electrically connect the write/read magnetic head elements 130a, 131a and 132a to the terminal electrodes 130b, 131b and 132b, respectively.

FIG. 4 shows a side view seen from the TBS direction schematically illustrating a configuration of each write/read magnetic head element of the thin-film magnetic head according to this embodiment.

As shown in this figure, a substrate 40, for example, with Al-Tic, etc., is coated by a base layer 41 with insulating material, for example, $Al_2O_3$, etc., further a lower shield layer (SF) 42 with soft magnetic material, for example, sendust, etc., is stacked on this layer.

A lower shield gap layer 44 with insulating material, for example, $Al_2O_3$, silicon oxide ($SiO_2$), etc., is stacked on the lower shield layer 42, further a MR layer 45, a lead conductive layer and a hard magnet layer 46 for magnetic domain control is stacked on this layer.

An upper shield gap layer 47 with insulating material, for example, $Al_2O_3$, $SiO_2$, etc., is stacked on the MR layer 45, the lead conductive layer and the hard magnet layer 46 for magnetic domain control, further an upper shield layer (SS1) 48 with soft magnetic material, for example, NiFe, etc., is stacked on this layer, further an intermediate non-magnetic layer 49 with non-magnetic material, for example, Ta, etc., is stacked on this layer.

A lower magnetic pole bottom layer (SS2) 50 with soft magnetic material, for example, NiFe, etc., of an inductive write head element is stacked on this intermediate non-magnetic layer 49, further a lower magnetic pole top layer (SS3) 51 with soft magnetic material, for example, NiFe, etc. of high coercivity (HiBs), is stacked on this layer, further a record gap layer 52 with insulating material, for example, $Al_2O_3$, etc., is stacked on this layer, further an upper magnetic pole layer (P2) 53 with soft magnetic material, for example, NiFe, etc. of HiBs, is stacked on this layer, further an overcoat layer 54 with insulating material, for example, $Al_2O_3$, etc., is stacked on this layer.

FIG. 5a to 5h show process sectional view schematically illustrating a part of wafer manufacturing process of the thin-film magnetic head shown in FIG. 1.

Figure 5A:
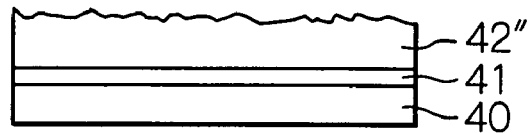
FIG. 5a to 5h show process sectional view schematically illustrating a part of wafer manufacturing process of the thin-film magnetic head shown in FIG. 1.

As shown in FIG. 5a, the substrate 40, for example, with Al-Tic, etc., is coated by the base layer 41, for example, with thickness of 1.0 µm (micrometer) with insulating material, for example, $Al_2O_3$, etc. The soft magnetic film 42″ for the lower shield layer with iron alloy that contains Si and Al such as sendust, etc., is laminated by a sputter, for example, with thickness of 3 µm. Thus the soft magnetic film 42″ with sendust laminated by the sputter has a columnar crystal structure.

Figure 5B:
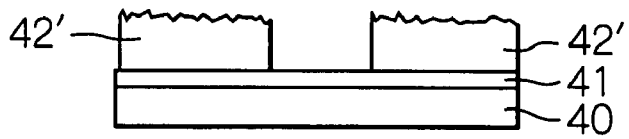

Next, as shown in FIG. 5b, this soft magnetic film 42″ is performed the patterning.

Figure 5C:
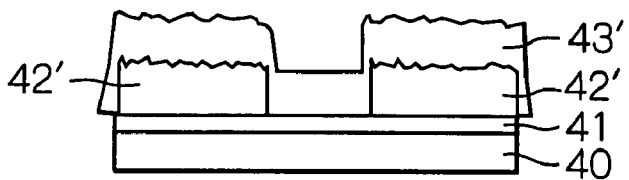

Next, as shown in FIG. 5c, the insulating layer 43′ with insulating material, for example, $Al_2O_3$, etc., for planarizing is laminated on the soft magnetic layer 42′ performed the patterning, for example, with thickness of 4 µm.

Figure 5D:
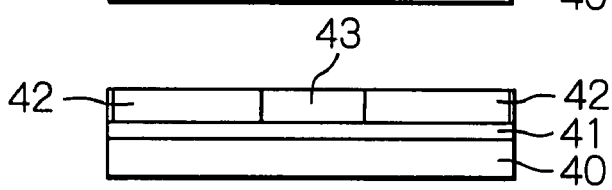

Next, by the following method, planarizing the surface of the insulating layer 43′ and the soft magnetic layer 42′ performed the patterning, as shown in FIG. 5d, the lower shield layer 42 and the insulating layer 43 whose surface is planarized and whose thickness is, for example, 2.00±0.30 µm is obtained.

(1) The First Polishing Process

As a first slurry, it is used an acid slurry which consists of mainly $Al_2O_3$, and which have specific gravity of 1.1, and whose pH is from 3.7 to 4.3. As the other elements of this slurry, this contains organic acid for increasing dispersibility and for polishing selectively convex parts of $Al_2O_3$, and amino compound for increasing dispersibility and for adjusting the pH. The content of each element is $Al_2O_3$ content of less than or equal 12%, organic acid content of less than or equal 1%, amino compound content of less than or equal 1%, and water content of more than or equal 86%. As such kind of the slurry, for example, there is the TKH-34P produced by BAIKOWSKI Japan Corp. Using this first slurry, further using two layers structure pad which contains the first layer of a contact face made of polyurethane foam, and the second layer with this cushion layer, the CMP is performed. The first layer of this pad is thickness of 0.8 mm, density of 0.73 g/cm$^3$, compressibility of 1%, modulus of compress elasticity (recovery) of 61%, hardness of 95 asker-C, and the second layer is thickness of 1.27 mm, compressibility of 8%, modulus of compress elasticity (recovery) of 88%, hardness of 61 asker-C. As such kind of the polishing pad, for example, there is the thing formed by stacked IC 1000 and Suba 400 produced by Nitta Haas Incorporated. A rotational speed of a polishing table on the first polishing process is about 45 rpm, and time of polishing is about 2.5 to 3 minutes.

(2) The Second Polishing Process

As the second slurry, it is used an acid or neutral slurry which consists of mainly $Al_2O_3$, and which have specific gravity of 1.04, and whose pH is from 6 to 7. As the other elements of this slurry, this contains nitric acid chemical compound for increasing a surface roughness, and amino compound for increasing dispersibility and for adjusting a pH. The content of each element is $Al_2O_3$ content of less than or equal 5%, nitric acid chemical compound content of less than or equal 1%, amino compound content of less than or equal 1%, and water content of more than or equal 93%. As such kind of the slurry, for example, there is the DH-6a produced by BAIKOWSKI Japan Corp. Using this second slurry, further using a pad for cleaning which consists of foam, the fine mechanical polishing (MP) is performed. But, this pad is thickness of 1.5 mm, compressibility of 13%. As such kind of the pad for cleaning, for example, there is the SUPREME RN-H produced by Nitta Haas Incorporated. A rotational speed of a polishing table on the second polishing process is about 25 to 80 rpm, and time of polishing is about 7 to 12 seconds.

A lower shield layer 42 whose surface roughness Ra is 0.5 to 0.8 nm is obtained from the soft magnetic film 42′ whose surface roughness Ra is 1.8 to 3.0 nm by aforementioned planarization process.

Figure 5E:
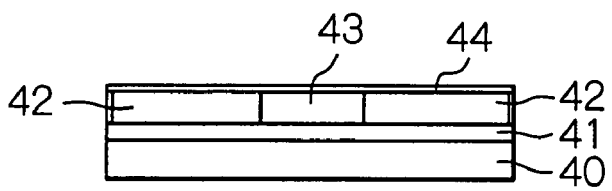

Next, as shown in FIG. 5e, a lower shield gap layer 44 with insulating material, for example, $Al_2O_3$, $SiO_2$, etc., is stacked, for example, with thickness of 100.0 nm on the lower shield layer 42 and the insulating layer 43.

Figure 5F:
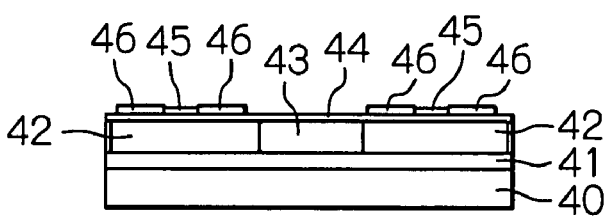

Next, as shown in FIG. 5f, a MR layer 45, a lead conductive layer and a hard magnet layer 46 for magnetic domain control is stacked on the lower shield gap layer 44.

The MR layer 45, in this embodiment, is formed of an anisotropic magnetoresistive effect (AMR) layer with a multilayer structure which consists of nickel iron chrome (NiFeCr)(thickness of 12.6 nm)/tantalum (Ta)(thickness of 6.0 nm)/NiFe (thickness of 25.0 nm)/Ta (thickness of 3.5 nm). The lead conductive layer, in this embodiment, is formed of stacking conductive material, for example, copper (Cu), etc. with thickness of 200 nm, and the hard magnetic layer, in this embodiment, is formed of a multilayer structure which consists of Ta (thickness of 3.0 nm)/chrome titanium (CrTi) (thickness of 5.0 nm)/cobalt chrome platinum (CoCrPt) (thickness of 60.0 nm)/chrome titanium (CrTi) (thickness of 10.0 nm)/Ta (thickness of 100.0 nm).

Figure 5G:
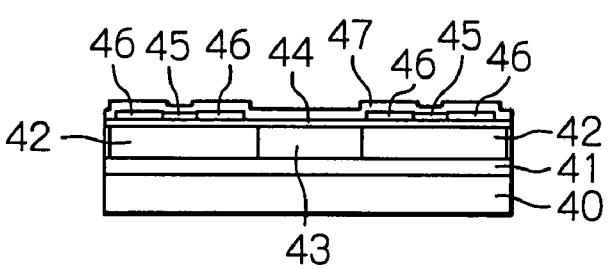

Next, as shown in FIG. 5g, an upper shield gap layer 47 with insulating material, for example, $Al_2O_3$, $SiO_2$, etc., is stacked, for example, with thickness of 100.0 nm on the MR layer 45, the lead conductive layer and the hard magnet layer 46 for magnetic domain control.

Figure 5H:
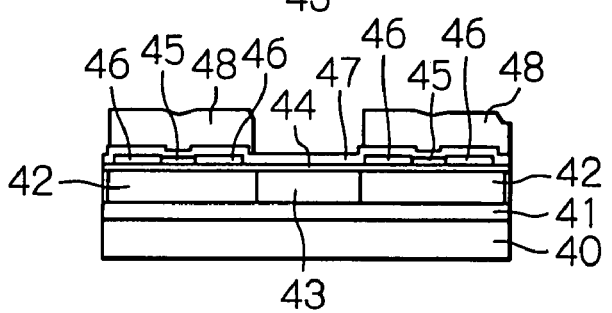

Next, as shown in FIG. 5h, an upper shield layer 48 with soft magnetic material, for example, iron alloy that contains Si and Al such as sendust, etc., is formed by the patterning, for example, with thickness of 2.0±0.3 µm on the upper shield gap layer 47.

As shown in FIG. 4, an intermediate non-magnetic layer 49 with non-magnetic material, for example, Ta, etc., is stacked, for example, with thickness of 0.020±0.002 nm on the upper shield gap layer 47 and the upper shield layer 48, and an inductive write head element is formed on the intermediate non-magnetic layer 49. Namely, a lower magnetic pole bottom layer 50 with soft magnetic material, for example, permalloy, etc., is stacked, for example, with thickness of 2.0±0.3 µM, and a lower magnetic pole top layer 51 with soft magnetic material, for example, NiFe, etc. of HiBs, is stacked, for example, with thickness of 3.5±0.3 µm, on this layer, further a record gap layer 52 with insulating material, for example, $Al_2O_3$, etc., is stacked, for example, with thickness of 0.45 µm, on this layer, further an upper magnetic pole layer 53 with soft magnetic material, for example, NiFe, etc. of HiBs, is stacked on this layer, further an overcoat layer 54 with insulating material, for example, $Al_2O_3$, etc., is stacked, for example, with thickness of 41+5/−2 µm, on this layer.

Also, it may be possible to substitute a giant magnetoresistive effect (GMR) layer or a tunneling magnetoresistive effect (TMR) layer for the AMR layer as the MR layer 45.

In the case of planarizing a surface of the lower shield layer laminated with sendust by the CMP according to this embodiment, or in the case of not planarizing, it is examined how a MR output and this standard deviation, and an asymmetry and this standard deviation differ by measuring the MR output with running the magnetic tape actually. The Table 1 shows this measurement results. A number of samples are 160 both at this embodiment and at the prior art, respectively.

TABLE 1

|  | surface roughness (nm) | output average (μV) | output standard deviation (μV) | asymmetry average (%) | asymmetry standard deviation (%) |
|---|---|---|---|---|---|
| Non-planarizing by the CMP | 1.8 | 2457 | 87 | −5.23 | 8.11 |
| planarizing by the CMP | 0.9 | 2362 | 55 | −5.05 | 6.50 |
|  | 0.7 | 2418 | 46 | −4.16 | 3.61 |

As shown in Table 1, planarizing by the CMP, the standard deviation of the MR output widely decreases from 87% to 55% or 46%, also, the standard deviation of asymmetry decreases from 8.11% to 6.5% or 3.61%. Namely, it is possible to form the lower shield layer by planarizing the surface of the layer with sendust by the CMP, and it is found to widely reduce the characteristics variation of the MR layer stacked on this layer.

It is also examined to what extent of the surface roughness Ra of the lower shield layer laminated sendust that the favorable MR output characteristics is obtained.

Figure 6:
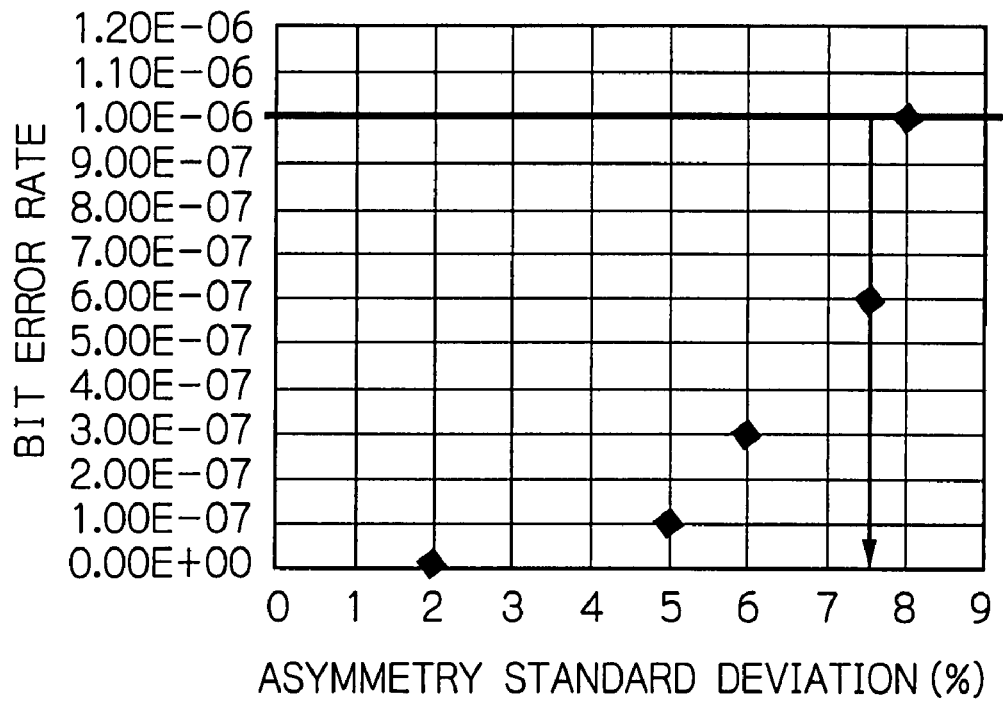
FIG. 6 shows a view of relation between an asymmetry standard deviation of a MR output and a bit error rate.
Figure 7:
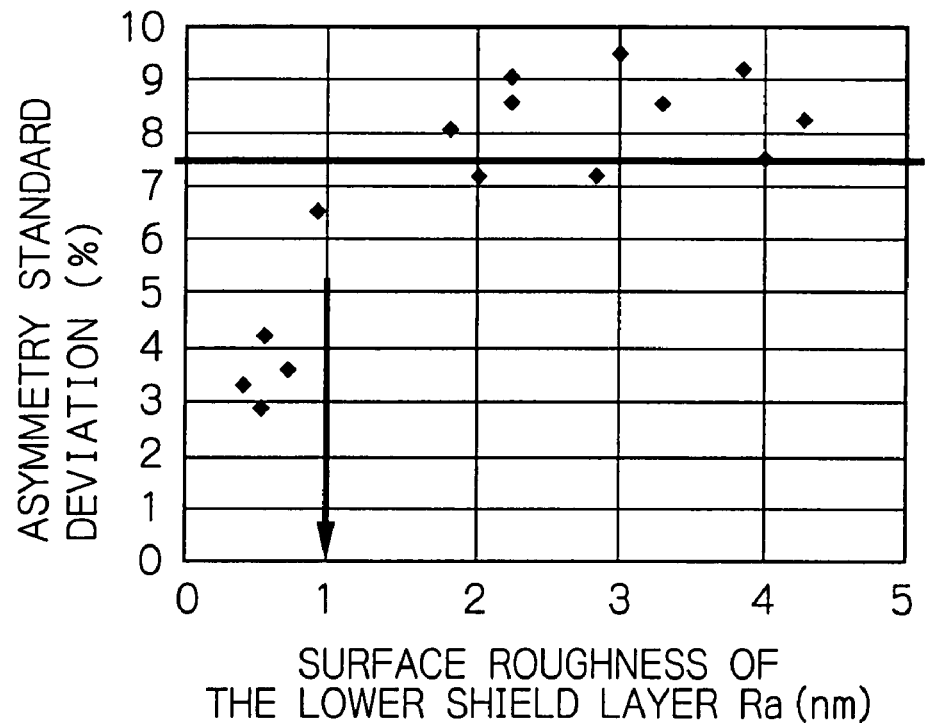
FIG. 7 shows a view of relation between a surface roughness Ra of a lower shield layer and the asymmetry standard deviation of the MR output.

FIG. 6 shows a view of relation between the asymmetry standard deviation of the MR output and a bit error rate. FIG. 7 shows a view of relation between the surface roughness of the lower shield layer and the asymmetry standard deviation of the MR output. But, at these figures, one plot shows the standard deviation with samples at N=160.

As shown in FIG. 6, in order to obtain the bit error rate which is an order of $10^{-7}$, it is necessary for this asymmetry standard deviation being less than or equal 7.5%. On the other hand, as shown in FIG. 7, for the asymmetry standard deviation being less than or equal 7.5%, the surface roughness Ra of the lower shield layer must be less than or equal 1 nm. Namely, planarizing as the surface roughness Ra of the lower shield layer being less than or equal 1 nm, the favorable MR output is obtained even in the case of forming the lower shield layer with sendust.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A manufacturing method of a thin-film magnetic head comprising the steps of:
    laminating and patterning a soft magnetic layer with iron alloy that contains silicon and aluminum through a base layer on a substrate;
    laminating an insulating layer on said patterned soft magnetic layer;
    performing a chemical-mechanical polishing of a surface of said laminated insulating layer and said patterned soft magnetic layer with a first acid slurry;
    forming a lower shield layer by a mechanical polishing with a second weak acid, or neutral slurry with a pH different from that of the first slurry; and
    forming a lower shield gap layer and a magnetoresistive effect layer on the lower shield layer.

2. The manufacturing method as claimed in claim 1, wherein said chemical-mechanical polishing and said mechanical polishing are performed on the same polishing equipment.

3. The manufacturing method as claimed in claim 1, wherein said soft magnetic layer is the magnetic layer with a columnar crystal structure.

4. The manufacturing method as claimed in claim 1, wherein said first slurry contains aluminum oxide as a polishing agent, and further contains organic acid.

5. The manufacturing method as claimed in claim 4, wherein a pH of said first slurry is from 3.7 to 4.3.

6. The manufacturing method as claimed in claim 1, wherein said second slurry contains aluminum oxide as a polishing agent, and further contains nitric acid chemical compound.

7. The manufacturing method as claimed in claim 6, wherein a pH of said second slurry is from 6 to 7.

8. The manufacturing method as claimed in claim 1, wherein said manufacturing method further comprises the steps of:
    stacking an upper shield gap layer on said lower shield gap layer and said magnetoresistive effect layer;
    stacking an upper shield layer on said upper shield gap layer.

9. The manufacturing method as claimed in claim 8, wherein said manufacturing method further comprises the step of:
    forming an inductive write head element on said upper shield layer.

* * * * *